United States Patent [19]
Edwards

[11] Patent Number: 5,493,937
[45] Date of Patent: Feb. 27, 1996

[54] LIGHT-WEIGHT BICYCLE CRANKSHAFT ASSEMBLY UTILIZING TWO-PIECE AXLE INTEGRALLY JOINED TO CRANK ARMS

[76] Inventor: Craig H. Edwards, 3765 Honolulu Ave., La Crescenta, Calif. 91214

[21] Appl. No.: 109,966

[22] Filed: Aug. 23, 1993

[51] Int. Cl.$^6$ ............................................. G05G 1/14
[52] U.S. Cl. ..................... 74/594.1; 74/594.2; 280/259; 280/281.1; 384/545
[58] Field of Search ................................ 74/594.1, 594.2; 280/259, 281.1; 384/537, 545, 626

[56] References Cited

U.S. PATENT DOCUMENTS

| | | | |
|---|---|---|---|
| 650,412 | 5/1900 | McLellan | 74/594.2 |
| 846,239 | 3/1907 | Osborne | 74/594.2 |
| 4,704,919 | 11/1987 | Durham | 74/594.1 |
| 4,793,208 | 12/1988 | Bregnard et al. | 74/594.2 |

FOREIGN PATENT DOCUMENTS

| | | | |
|---|---|---|---|
| 25920 | 4/1908 | Sweden | 74/594.2 |

Primary Examiner—Rodney H. Bonck
Assistant Examiner—Troy Grabow
Attorney, Agent, or Firm—Ladas & Parry

[57] ABSTRACT

A light-weight, strong and rigid bicycle crankshaft assembly utilizing a two-piece spindle. Each spindle piece is integrally joined to a crank arm, and this joint, as well as the joint of the crank arm and the pedal tube, is reinforced with gussets. The two spindle pieces themselves are connected by means of a simple allen bolt within the interior of the bottom bracket shell, and this connection is thereby protected from the elements. As the two spindle pieces are pulled together by the allen bolt, they exert opposing forces on the inner race of a cartridge bearing, thereby fixing the lateral location of the spindle within the bottom bracket without exerting pre-load on the bearings. Proper alignment is easily accomplished by means of one or more spacers placed on either side of this inner race of the cartridge bearing.

6 Claims, 5 Drawing Sheets

LIGHT-WEIGHT BICYCLE CRANKSHAFT ASSEMBLY UTILIZING TWO-PIECE AXLE INTEGRALLY JOINED TO CRANK ARMS

BACKGROUND

1. Field of the Invention

This invention relates to bicycle crankshaft assemblies designed to be of minimal weight and maximal strength and rigidity, and to allow ease of assembly, adjustment and disassembly.

2. Description of the Prior Art

There is much demand for light, rigid and strong crankshaft assemblies. Because the crankshaft assembly is z-shaped, and must be installed so that its center portion is located within a relatively narrow diameter hub (known as the bottom bracket shell) of the frame of the bicycle, if a crankshaft assembly has no detachable joints but is one-piece, it must be shaped in a way which yields poor strength and rigidity relative to weight.

For this reason, higher quality crankshaft assemblies utilize detachable joints: they consist of two or three parts which are removably attached to form the complete assembly. Because joints are inherently the weakest point in a structure, including a crankshaft assembly (other things being equal), the location of the joints in a crankshaft assembly is critical to achieving the optimum relation of strength and rigidity to weight.

The typical three-piece crankshaft assemblies used in higher quality bicycles utilize two joints. The end of each crank arm opposite the pedal (the "pedal-opposite end" or "spindle end") is removably attached to an end of the shaft or spindle. Unfortunately however, the junction of the crank arm and spindle is the least desirable joint location for at least four reasons:

1. The junction of the crank arm and spindle is the point of highest stress and load in the crankshaft assembly.
2. To accommodate this great stress and load, the joints, including both the ends of the spindle and the pedal-opposite ends of the crank arms, require reinforcement through extra material which excessively increases the weight of the crankshaft assembly.
3. The necessity of enabling the pedal-opposite end of the crank arm and the end of the spindle to be separable or detachable, and the design requirements of the joint to accommodate the great stress and load to which it is subjected, prevent both the spindle and the crank arms from being shaped in the way that best maximizes their strength and rigidity while minimizing their weight.
4. Finally, at this location, the joints are especially subject to the elements and therefore prone to corrosion.

To lessen these disadvantages, several two-piece crankshaft assemblies have recently been introduced. In these designs, the pedal-opposite end of one crank arm is permanently attached to one end of the spindle, usually by welding, while the pedal-opposite end of the other crank arm is removably attached to the other end of the spindle. Durham, U.S. Pat. No. 4,704,919 (1987) discloses one such design. These designs reduce the disadvantageous effects of the three-piece design, since on one side of the assembly the separable junction or joint between the pedal-opposite end of the crank arm and the spindle end is eliminated. However, on the other side of the assembly, the conventional separable junction location, with its disadvantages, is still utilized.

Two-piece assemblies in the early art disclosed by Ludlow and Taylor, U.S. Pat. No. 648,077 (1900); Scott, U.S. Pat. No. 627,597 (1899); Annable, U.S. Pat. No. 622,644 (1899); and Jerome, U.S. Pat. No. 623,373 (1899) avoid use of the conventional crank arm/spindle junctions. Instead, each crank arm is integrally connected to an axle or spindle portion, and the two spindle portions are removably joined. One spindle portion is solid, extends all or part way through the bottom bracket shell, and terminates in a solid, threaded stud. The other spindle portion consists of a hollow sleeve which fits over the solid spindle portion. The two spindle portions are joined by means of a nut tightened onto the threaded stud of the solid spindle portion and butting against a shoulder of the hollow spindle portion.

However, because of the first crank arm's solid axle portion with its solid threaded stud, and because of the large amount of overlap between the two axle portions, assemblies constructed according to these designs were excessively heavy and appear to be completely out of use in recent times.

Previously, neither one-piece, two-piece or three-piece crankshaft assemblies have achieved the optimum relation in the crank arms between strength and rigidity on the one hand, and lightness on the other hand. As discussed above, in three and some two-piece designs this is in part caused by choosing to conventionally detachably join the crank arm to the spindle. But even where one or both crank arms are integrally connected with the corresponding ends of the spindle, this optimum relation has not been achieved. Relatively great forces are exerted at both the pedal and the spindle ends of the crank arms, and the previous means of reinforcing these ends in order to dissipate or transfer these forces add an unnecessarily large amount of weight.

In virtually all known previous crankshaft assemblies, one-piece, two-piece and three-piece, lateral adjustment of the assembly, including the sprocket or sprockets, and sometimes also the elimination of play in the axle, are accomplished in manners which exert inward force on the outer portions of the bearings. For example, in Durham, lateral adjustment of the sprocket is accomplished through spacers or washers inserted on the spindle between the crank arms and the bearings. In conventional designs, elimination of axle play and any allowable lateral adjustment are accomplished by tightening one or both of the outer races against the bearings. As a result, in all of these assemblies the bearings are subject to pre-load. A few designs eliminate this pre-load by adding a means of exerting a compensating outward force on the inward portions of the bearings. However, this entails additional weight. The remaining assemblies all experience pre-load, causing increased resistance and wear on the bearings.

In most two and three-piece crankshaft assemblies some or all of the hardware which removably joins the various components, and in some cases this junction itself, is located outside of the bottom bracket compartment. This detracts from the clean, integrated appearance of the entire assembly, creates additional recesses and cavities which collect dirt and grime, and exposes this hardware to the elements, leaving it susceptible to corrosion and sticking or "freezing."

A final disadvantage of most two and three-piece crankshaft assemblies is that at least one, and often several, relatively expensive, specialized tools are required to install, adjust, and remove the crankshaft assembly.

SUMMARY OF THE INVENTION

Accordingly, several objects and advantages of my crankshaft assembly are to provide a crankshaft assembly where:

a. each crank arm is integrally connected to the corresponding end of a two-piece spindle, b. the detachable joint between the two spindle portions is located within the bottom bracket between the bearings, and c. the pedal and spindle ends of the crank arms are reinforced in a manner which maximizes their strength and rigidity with minimal additional weight;

thereby:

a. transferring the detachable joint of the various components of the crankshaft assembly from an area of high stress to an area of lower stress, b. allowing both the spindle and the crank arms to be shaped and joined in the way that best maximizes their strength and rigidity while minimizing their weight;

c. enabling the crankshaft assembly to be easily and conveniently installed and removed with one common tool;

d. enabling the crankshaft assembly to be easily and conveniently adjusted to align the sprocket or sprockets with the chain line;

e. leaving the bearings free from any pre-load;

f. minimizing the hardware necessary to removably join the components of the crankshaft assembly; and g. enabling the junction of the various components, and the hardware for removably accomplishing this junction, to be hidden within the bottom bracket compartment, and protected from the elements.

Further additional objects and advantages will become apparent from a consideration of the ensuing description and drawings.

DETAILED DESCRIPTION OF THE PREFERRED EMBODIMENT

Figure 1:
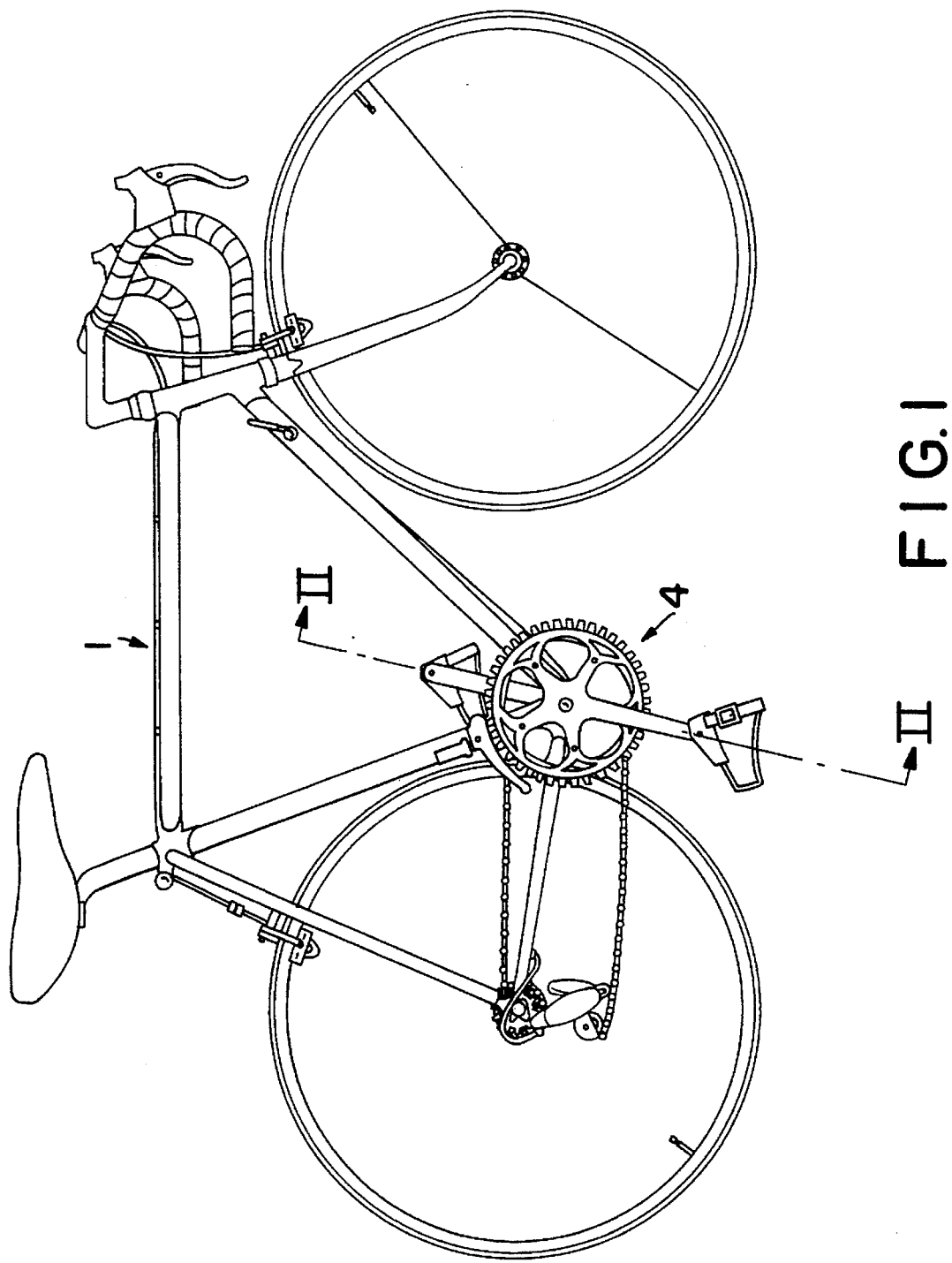
FIG. 1 shows, in side view, a bicycle, with a crankshaft assembly in accordance with the present invention.

FIG. 1 shows in side view, a bicycle (1), whose frame has a bottom bracket shell (2) [hidden in FIG. 1] which supports and acts as a hub for a crankshaft assembly (4), such as the one I have invented.

Figure 2:
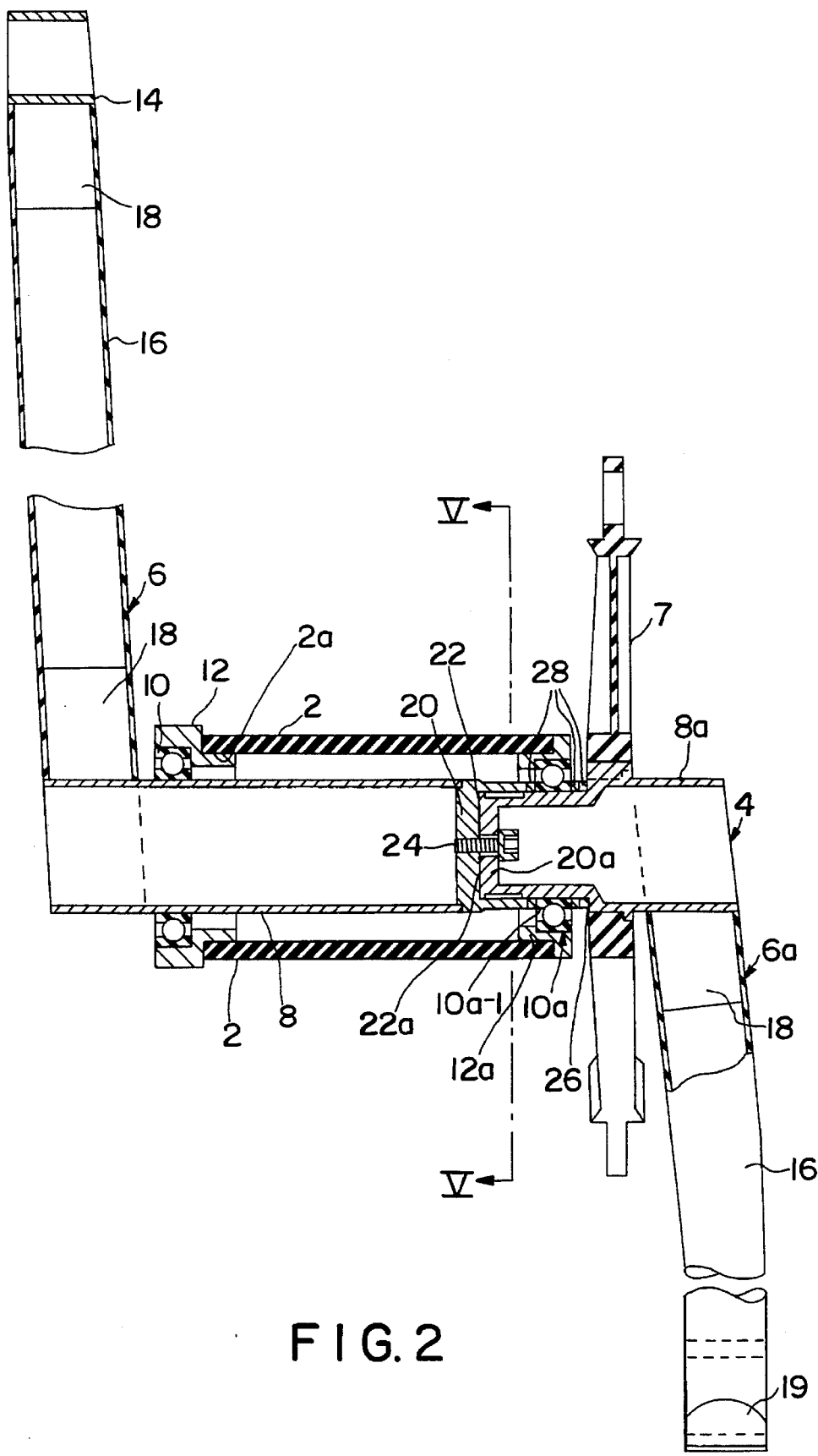
FIG. 2 is a cross-sectional view of entire crankshaft assembly taken along the line "FIG. 2 & 3—FIG. 2 & 3" in FIG. 1.

FIG. 2 shows a cross-sectional view of the crankshaft assembly I have invented. The crankshaft assembly (4) consists of a non-drive side crank arm and partial spindle piece (6), a drive side crank arm and partial spindle piece (6a), a spider (7) connected to the drive side crank arm and partial spindle piece and used to removably attach one or more sprockets or chain wheels (not shown), a means (described and referenced below) of coupling the spindle tubes (8 and 8a) of the two crank arm and partial spindle pieces (6 and 6a), a non-drive side cartridge bearing (10) and bearing cup (12), and a drive side cartridge bearing (10a) and bearing cup (12a).

Figure 3:
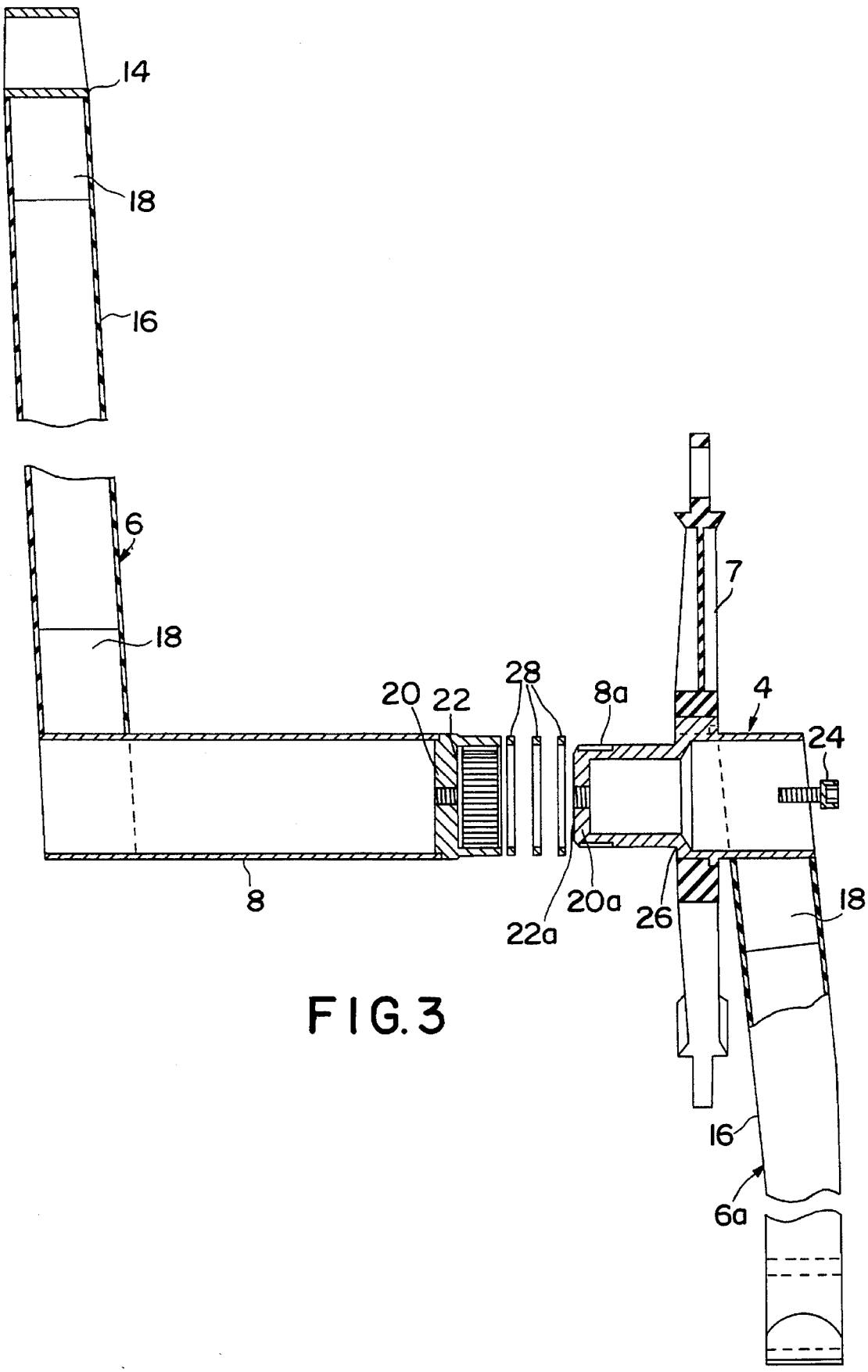
FIG. 3 is a cross-sectional view of both of the crank arm and spindle portions in same perspective as in FIG. 2, above, but not connected, and without any other structure shown.
Figure 4:
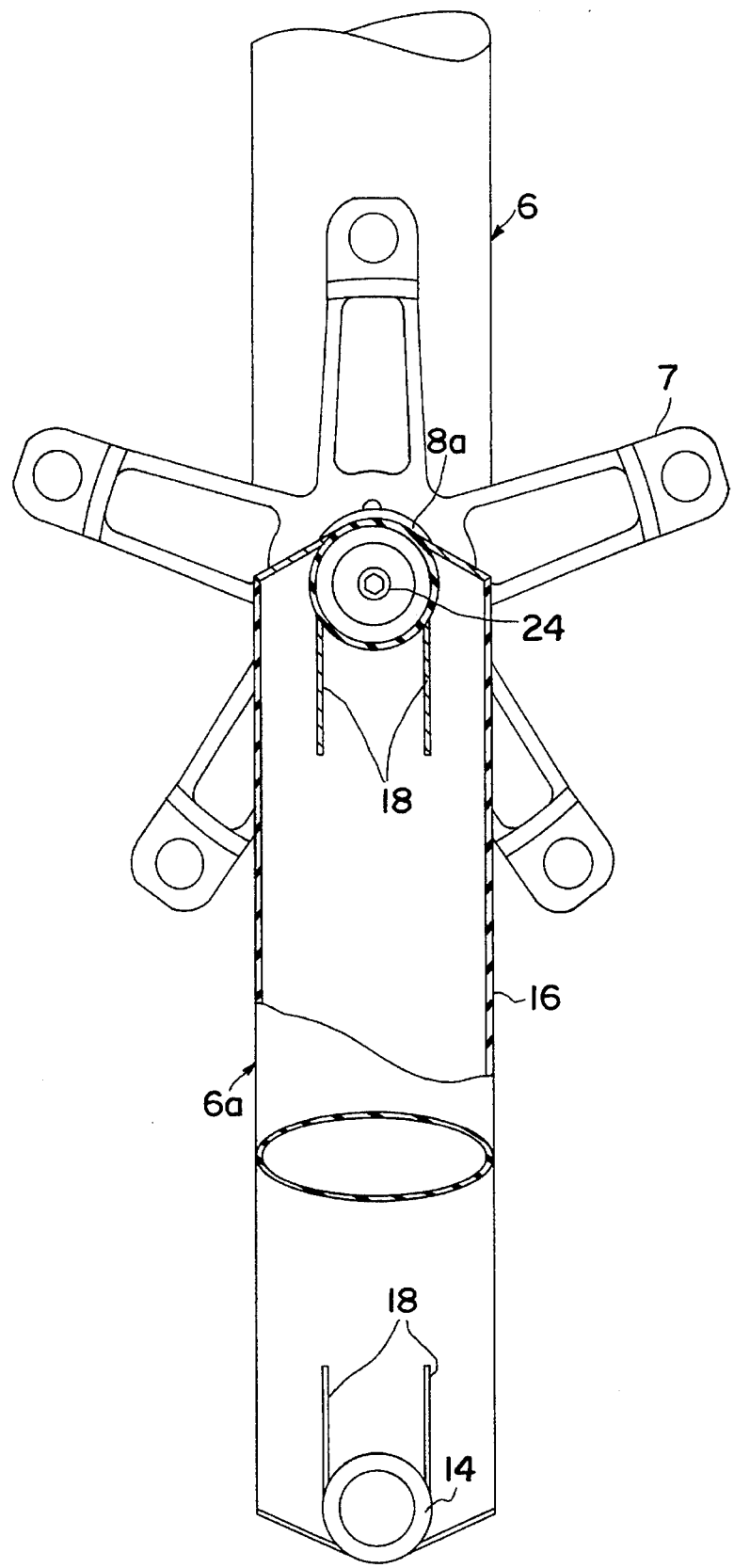
FIG. 4 is a partial right side view of the crank arms and spindle in the crankshaft region of the bicycle of FIG. 1.

As shown in FIGS. 2 and 3, in the preferred embodiment, the drive side and non-drive side crank arm and partial spindle pieces (6a and 6) each consist of a pedal tube (14), a crank arm tube (16) and a spindle tube (8 and 8a). The pedal tube (14) consists of a short steel tube, internally threaded to accept a conventional threaded pedal axle. As shown in FIGS. 2, 3 and 4, the pedal tube (14) is located and attached by welding within a bore at the outer, pedal end of the crank arm tube (16), with its axis or length parallel to the axis or length of the bottom bracket shell (2).

Referring to FIGS. 2 and 3, each spindle tube (8 and 8a) is made from thin-walled steel tubing. An outer end of each spindle tube (8 and 8a) is located and attached by welding within a bore at the spindle end of the crank arm tube (16), with the spindle tube's (8 and 8a) axis or length parallel to the axis or length of the bottom bracket, and the spindle tube (8 or 8a) extends inward from the crank arm tube (16) into the bottom bracket shell (2), where it is joined to the spindle tube (8a or 8) from the opposite crank arm and partial spindle piece (6a or 6).

Referring to FIGS. 2, 3 and 4, the crank arm tube (16) is also made from thin-walled steel tubing. The crank arm tube (16) circumference is elliptical; as shown in FIGS. 3 and 4, the crank arm tube (16) thus has a lesser width or diameter, and a greater width or diameter. As shown in FIGS. 2 and 3, the lesser diameter of the crank arm tube (16) runs approximately parallel to the axes of the pedal tube (14), the spindle tube (8 and 8a) and the bottom bracket shell (2), and is approximately equal in length to the length of the pedal tube (14). As shown in FIG. 4, the greater diameter of the crank arm tube (16) runs approximately perpendicular to the axes, and approximately parallel to the diameters, of the pedal tube (14), the spindle tube (8 and 8a) and the bottom bracket shell (2). The length of the greater diameter of the crank arm tube (16) significantly exceeds the diameters of both the pedal tube (14) and the spindle tube (8 and 8a). This elliptical shape of the crank arm tube (16) maximizes the crank arm tube's (16) ability to withstand the forces exerted upon it under pedalling load. As a result, a crank arm designed thus according to my invention is significantly stiffer and stronger, but also lighter, than a conventional crank arm.

Normally, where as described above, the width of the crank arm tube (16) significantly exceeds the diameters of the pedal tube (14) and the spindle tube (8 and 8a), the forces under pedalling load from the pedal tube (14) to the crank arm, here the crank arm tube (16), and from the crank arm to the spindle tube (8 and 8a), are high enough to cause local buckling and failure at these joints. This has prevented the use, in the prior art, of crank arms in elliptical, oval, or other shapes where both the crank arm's width exceeds the diameters of the pedal tube or spindle tube, and the crank arm is completely hollow or made from thin walled tubing. In the crankshaft assembly I have invented, the successful or structurally sound transfer of these forces is accomplished by means of internal gussets (18), and external caps (19).

The internal gussets (18) consist of flat plates, as shown in FIGS. 3 and 4. At the pedal end of the crank arm tube (16), these gussets (18) extend longitudinally from the pedal tube (14) a relatively short distance along the length of the crank arm tube (16), and latitudinally across the crank arm tube (16) on chords parallel to the crank arm tube's lesser diameter. Each gusset (18) is welded to all abutting surfaces, i.e. the two opposite walls of the crank arm tube (16) and an axis on the outer surface of the pedal tube (14). In the preferred embodiment, the pedal tube (14) is reinforced by two such gussets (18), and each spindle tube (8 and 8a) is also reinforced by two gussets (18) according to the same design.

As shown in FIGS. 2, 3, and 4, the external caps (19) consist of flat or slightly curved plates. These external caps (19) close the openings left in the crank arm tube (16) on both sides of the pedal tube (14) and of the spindle tube (8 and 8a), and are welded to the outer surface of either the pedal tube (14) or the spindle tube (8 and 8a), and to the exposed rim or end of the crank arm tube (16).

As shown in FIG. 2, each side of the bottom bracket shell (2) is internally threaded (at 2a) to accept externally threaded bearing cups, the drive side and non-drive side bearing cups (12a and 12). Each bearing cup (12a and 12) permanently holds one of the two cartridge bearings, the drive side and non-drive side cartridge bearings (10 and 10a). The spindle tube (8a) of the drive side crank arm and partial spindle piece (6a) has an outer diameter virtually equal to the inner diameter of the drive side cartridge bearing (10a), and slips, snugly, through the drive side cartridge bearing (10a) a relatively small distance into the bottom bracket shell (2). Similarly, the spindle tube (8) of the non-drive side crank arm and partial spindle piece (6) has an outer diameter virtually equal to the inner diameter of the non-drive side cartridge bearing (10), and slips, snugly, through the non-drive side cartridge bearing (10), extending through the bottom bracket shell (2) almost completely to the drive side cartridge bearing (10a).

However, as also shown in FIG. 2, the outer diameter of drive side spindle tube (8a), and the corresponding inner diameter of the drive side cartridge bearing (10a), are smaller than the outer diameter of non-drive side spindle tube (8), and the corresponding inner diameter of the non-drive side cartridge bearing (10). This allows an inner section of the drive side spindle tube (8a) to fit within an inner section of the non-drive side spindle tube (8).

Figure 5:
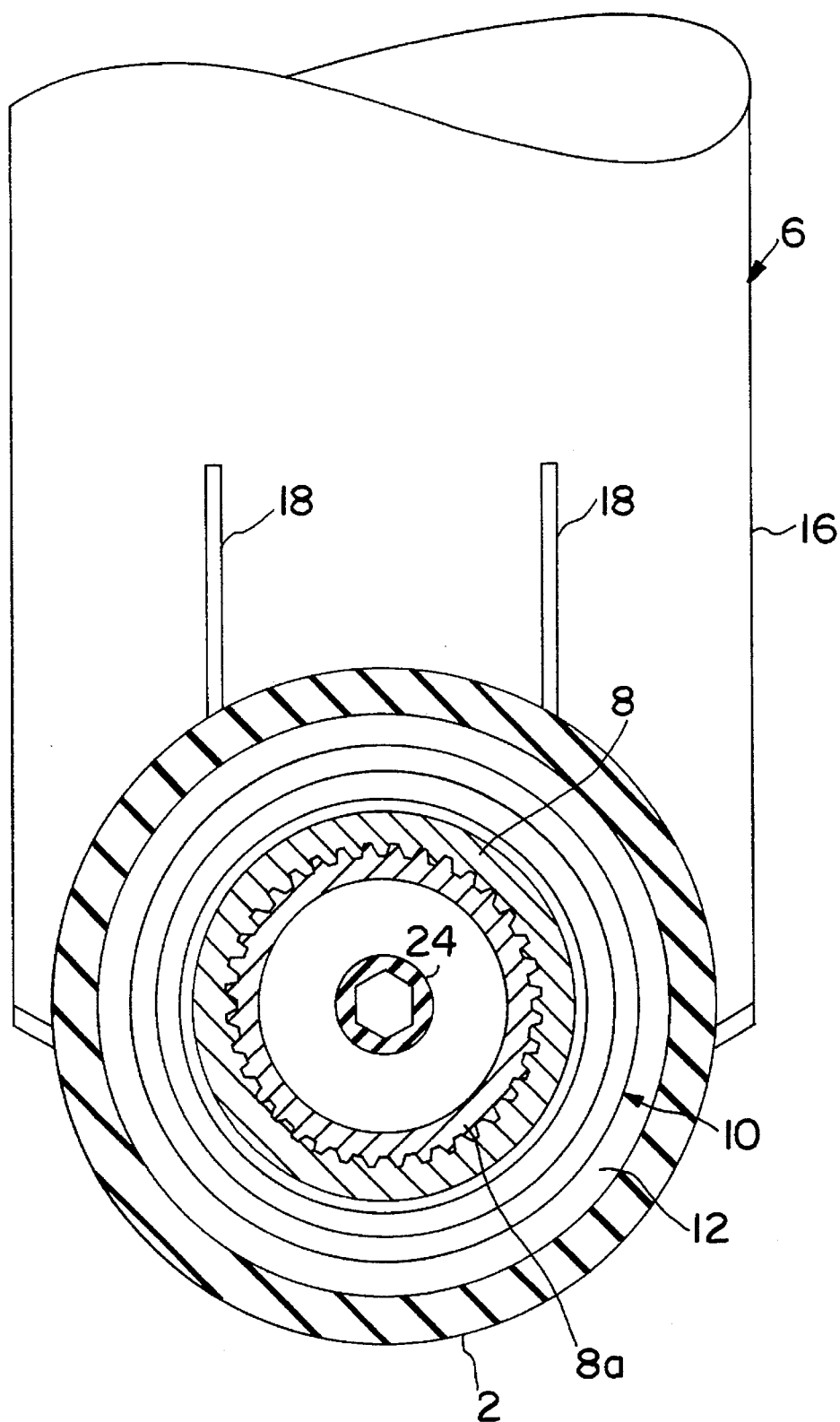
FIG. 5 is a cross-sectional view of the crankshaft assembly taken along the line "FIG. 5—FIG. 5" in FIG. 2.

As shown in FIG. 5, the inner section of the non-drive side spindle tube (8) is internally splined to correspond to external splines on the inner section of the drive side spindle tube (8a). These splines prevent relative rotation between the non-drive and drive side crank arm and partial spindle pieces (6 and 6a [not shown if FIG. 5]).

As shown in FIG. 2, a non-drive side blocking disc (20) with an internally threaded central bore, is welded close to, but not at, an inner end of the non-drive side spindle tube. A drive side blocking disc (20a) with a central bore is welded at an inner end of the drive side spindle tube. A threaded shaft of a conventional allen-head bolt (24) passes through the drive side blocking disc (20a) and is threaded into the non-drive side blocking disc (20) to removably and securely join the non-drive and drive side crank arm and partial spindle pieces (6 and 6a).

Thus, the detachable joint connecting the non-drive and drive side crank arm and partial spindle pieces (6 and 6a), and the entire means of accomplishing this joint, are located within the bottom bracket shell (2), between and interior to the non-drive side bearing cup (12) and non-drive side cartridge bearing (10) on the one hand, and the drive side bearing cup (12a) and the drive side cartridge bearing, on the other hand. This unique feature, alone or in conjunction with other features described here, makes possible all the advantages of my invention: It locates the detachable joint of the various components of the crankshaft at an area of low stress, protected from the elements; it allows the spindle and the crank arms to be integrally joined and to be shaped in the way that best maximizes their strength and rigidity while minimizing their weight; it makes the crankshaft assembly easy to install, adjust and remove with just one tool, a common allen wrench, and just one common allen-head bolt; and, as described below, it leaves the bearings free from any pre-load.

As shown in FIG. 2, a drive side shoulder (26) is provided on the drive side spindle tube (8a) a short distance outward from the drive side cartridge bearing (10a). Since, as described above, the inner end of the non-drive side spindle tube (8) has an outer diameter greater than the inner diameter of the drive side cartridge bearing (10a) and extends almost completely to the drive side cartridge bearing (10a), the inner end of the non-drive side spindle tube (8) thus functions as a shoulder on the inward side of the drive side cartridge bearing (10a). Alignment of the crankshaft assembly (4) with the chain line is thus easily accomplished by means of alignment spacers or washers (28) placed on the drive side spindle tube (8a), on either or both sides of the drive side cartridge bearing (10a). Alignment washers (28) placed between the drive side shoulder (26) and the drive side cartridge bearing (10a) will pull the crankshaft assembly (4), and any sprocket or sprockets mounted on the crankshaft assembly (4) outward, away from the bottom bracket shell (2), until the inner end of the non-drive side spindle tube (8) contacts the drive side cartridge bearing (10a). Alignment washers (28) placed between the inner end of the non-drive side spindle tube (8) and the drive side cartridge bearing (10a) will pull the crankshaft assembly (4) and any sprocket or sprockets the opposite direction, until the drive side shoulder (26) contacts the drive side cartridge bearing (10a). Furthermore, if necessary, the relative width of the crankshaft assembly (4) can be increased by placing alignment washers (28) between the drive side and non-drive side blocking discs (20 and 20a).

In the preferred embodiment, as shown in FIG. 2, the outer diameters of the alignment washers (28), the drive side shoulder (26), and the inner end of the non-drive side spindle tube, will not exceed the outer diameter of an inner race (10a-1) of the drive side cartridge bearing (10a). Because alignment of the entire crankshaft assembly (4) will thus be fixed by means of outward and inward forces on just an inner race (shown here as 10a-1) of one cartridge bearing, the bearings will be free from any pre-load.

Conclusion, Ramifications, and Scope

Thus, the reader will see that this invention discloses a crankshaft assembly which achieves the optimum relation between strength and rigidity on the one hand and lightness on the other, which is easily and conveniently installed, removed and adjusted, whose bearings are not subject to any pre-load, and in which the hardware for removably joining the separate sections, and this joint itself, is hidden within the bottom bracket compartment, and protected from the elements.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed. For example, the thin-walled tubing I have described need not be of steel, but could be of other strong, light-weight materials such as titanium or carbon fiber. As another example, the inner section of the non-drive side spindle tube, by virtue of its internal splines and blocking disc, described above, functions as a cup to accept the inner end of the drive side spindle tube. This cup function need not be performed by the inner end of the non-drive side spindle tube itself. Instead, a separate cup performing the same function could be welded onto the end of the non-drive side spindle tube. As a final example, while I have described a simple and direct way of joining the non-drive and drive side crank arm and partial spindle pieces within the bottom bracket shell and between the bearing assemblies, other means of accomplishing this joint in the same area are possible.

Accordingly, the scope of the invention should be determined not by the embodiments illustrated, but by the appended claims and their legal equivalents.

I claim:

1. A bicycle crankshaft assembly comprising:
   a bottom bracket shell;
   two crank arms;
   a spindle or axle comprising two separate spindle pieces, one of said crank arms integrally attached to one of said spindle pieces, and the other of said crank arms integrally attached to the other of said spindle pieces, an attachment means for securely yet removably attaching said two spindle pieces;
   a rotation-enabling supporting means supporting and enabling rotation of said spindle within said bottom bracket shell;
   a hypothetical cylinder having a circumference defined by said bottom bracket shell, and having axial or lateral ends defined by two opposing axially outermost portions of said rotation-enabling supporting means, said attachment means being entirely located within said hypothetical cylinder; and wherein:
   said rotation-enabling supporting means comprises two bearings;
   the first of said spindle pieces passes through the first of said bearings, and the second of said spindle pieces passes through the second of said bearings;
   each of said spindle pieces has an inner end, the inner end of the first of said spindle pieces comprising a male head member, and the inner end of the second of said spindle pieces comprising a female receptacle or socket capable of receiving the male head member of the first of said spindle pieces, such that when the inner end of the first of said spindle pieces is received into the inner end of the second of said spindle pieces, said two spindle pieces are prevented from rotating relative to each other;
   one of said spindle pieces comprises a hollow tube;
   there is a bore in the inner end of said spindle piece comprising a hollow tube;
   there is a threaded bore in the inner end of the other of said spindle pieces;
   said attachment means comprises a bolt passing through said bore in the inner end of said spindle piece comprising a hollow tube, and threaded into the threaded bore in the inner end of the other of said spindle pieces;
   said rotating element comprises an inner race of the first of said bearings;
   one of said two spindle fixing means comprises a shoulder located on the first of said spindle pieces outward of said rotating element; and
   the other of said two spindle fixing means comprises an innermost edge or rim of said receptacle or socket of the inner end of the second of said spindle pieces.

2. The bicycle crankshaft assembly of claim 1 wherein each said crank arm comprises two opposing sides or walls, and said assembly comprises:
   at least one joint whereby an end of one of said crank arms is joined to an element from a set comprising a pedal tube for attachment of a pedal, and one of said spindle pieces; and
   at least one gusset reinforcing said joint, said gusset comprising a flat, thin plate, said gusset located within said one crank arm, extending from said joint a predetermined length within said one crank arm, and extending latitudinally across said two opposing sides of said one crank arm, said gusset butting and permanently attached both to said element from said set comprising said pedal tube and said spindle piece, and to said opposite sides of said one crank arm.

3. The bicycle crankshaft assembly of claim 2, wherein, at said joint, a width of said end of said crank arm extends beyond a diameter of said element from said set comprising said pedal tube and said spindle piece, said assembly further comprising:
   at least one excess opening consisting of an area where said width of said end of said crank arm extends beyond said element from said set; and
   a thin end cap closing off or sealing said excess opening, and permanently attached both to said end of said crank arm and to said element of said set.

4. A bicycle crankshaft assembly comprising:
   a bottom bracket shell;
   two crank arms;
   a spindle or axle comprising two separate spindle pieces, one of said crank arms integrally attached to one of said spindle pieces, and the other of said crank arms integrally attached to the other of said spindle pieces, an attachment means for securely yet removably attaching said two spindle pieces;
   a rotation-enabling supporting means supporting and enabling rotation of said spindle within said bottom bracket shell;
   a hypothetical cylinder having a circumference defined by said bottom bracket shell, and having axial or lateral ends defined by two opposing axially outermost portions of said rotation-enabling supporting means, said attachment means being entirely located within said hypothetical cylinder; and wherein:
   said rotation-enabling supporting means comprises two bearings;
   the first of said spindle pieces passes through the first of said bearings, and the second of said spindle pieces passes through the second of said bearings;
   each of said spindle pieces has an inner end, the inner end of the first of said spindle pieces comprising a male head member, and the inner end of the second of said spindle pieces comprising a female receptacle or socket capable of receiving the male head member of the first of said spindle pieces, such that when the inner end of the first of said spindle pieces is received into the inner end of the second of said spindle pieces, said two spindle pieces are prevented from rotating relative to each other;
   one of said spindle pieces comprises a hollow tube;
   there is a bore in the inner end of said spindle piece comprising a hollow tube;

there is a threaded bore in the inner end of the other of said spindle pieces;

said attachment means comprises a bolt passing through said bore in the inner end of said spindle piece comprising a hollow tube, and threaded into the threaded bore in the inner end of the other of said spindle pieces;

said rotating element comprises an inner race of the first of said bearings;

one of said two spindle fixing means comprises a shoulder located on the first of said spindle pieces outward of said rotating element;

the other of said two spindle fixing means comprises an innermost edge or rim of said receptacle or socket of the inner end of the second of said spindle pieces;

at least one of said two spindle fixing means includes a spacing means; and said spacing means is capable of being mounted on said spindle on at least one side of said rotating element of said rotation-allowing means.

5. The bicycle crankshaft assembly of claim 4 wherein each said crank arm comprises two opposing sides or walls, and said assembly comprises:

at least one joint whereby an end of one of said crank arms is joined to an element from a set comprising a pedal tube for attachment of a pedal, and one of said spindle pieces; and at least one gusset reinforcing said joint, said gusset comprising a flat, thin plate, said gusset located within said one crank arm, extending from said joint a predetermined length within said one crank arm, and extending latitudinally across said two opposing sides of said one crank arm, said gusset butting and permanently attached both to said element from said set comprising said pedal tube and said spindle piece, and to said opposite sides of said one crank arm.

6. The bicycle crankshaft assembly of claim 5, wherein, at said joint, a width of said end of said crank arm extends beyond a diameter of said element from said set comprising said pedal tube and said spindle piece, said assembly further comprising:

at least one excess opening consisting of an area where said width of said end of said crank arm extends beyond said element from said set; and a thin end cap closing off or sealing said excess opening, and permanently attached both to said end of said crank arm and to said element of said set.

\* \* \* \* \*